Patented May 26, 1936

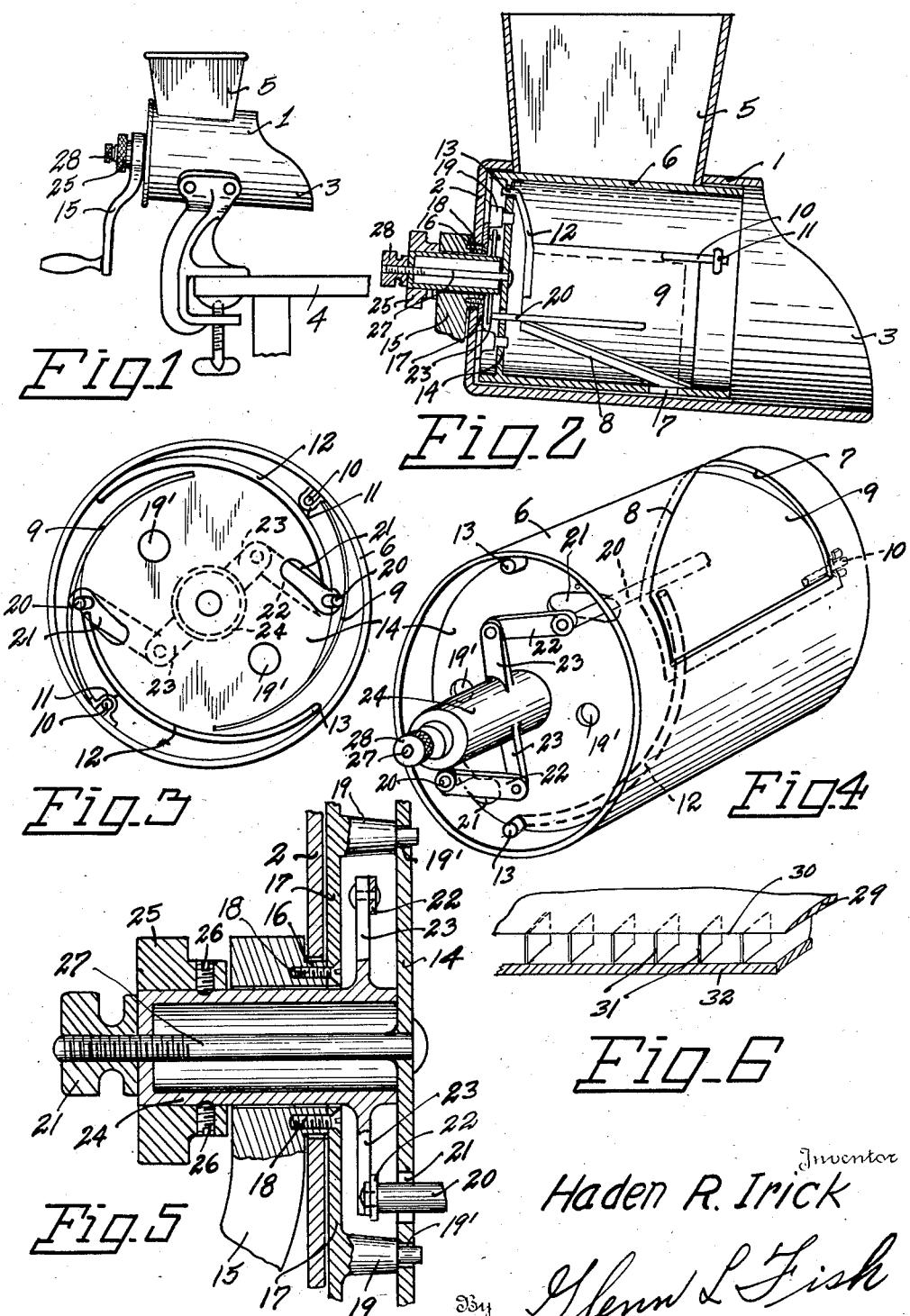

2,041,766

UNITED STATES PATENT OFFICE 2,041,766

VEGETABLE SLICING MACHINE

Haden R. Irick, Spokane, Wash., assignor of one-half to Leroy L. Ritter, Hooper, Wash.

Application November 26, 1934, Serial No. 754,814

4 Claims. (Cl. 146—91)

This invention relates to vegetable slicing machines and one object of the invention is to provide an implement of this character which may be applied to a kitchen table and vegetables easily and quickly sliced and the slices delivered into a bowl or other receptacle from a spout of the cylindrical body of the device.

Another object of the invention is to provide a vegetable slicer wherein the vegetables are placed in a hopper over a cylindrical casing and formed into slices by a cutter rotatably mounted in the casing and of such construction that the slices may pass to an outlet at one end of the casing.

Another object of the invention is to provide the cutter with gauge plates serving to support the vegetables in position for slicing by sharpened edges of the cutter, the plates being so mounted that they may be adjusted to control the thickness of the slices cut from the vegetables.

Another object of the invention is to provide improved adjusting means for the supporting plates having actuating means disposed externally of the casing so that adjustments may be easily made.

Another object of the invention is to so construct the slicer that it may be easily taken apart and thoroughly cleaned.

The invention is illustrated in the accompanying drawing, wherein:

Figure 1 is a side elevation showing the improved vegetable slicer applied to a table for use.

Figure 2 is a view showing the slicer in longitudinal section.

Figure 3 is a view looking at the delivery end of the slicer.

Figure 4 is a perspective view of the slicer.

Figure 5 is an enlarged fragmentary sectional view showing the operating mechanism for the slicer.

Figure 6 is a fragmentary view illustrating means used for cutting French fried potatoes.

The improved vegetable slicer has a cylindrical casing or barrel 1 which is closed at one end by a head 2 and has its other end open and shaped to define a discharge spout 3 from which slices cut from vegetables pass into a bowl or other receptacle placed upon a table 4 with which the slicer is connected by a bracket secured to and depending from the barrel 1. An inlet is formed in the upper portion of the barrel and through this inlet the lower open end of a hopper 5 communicates with the interior of the barrel.

The slicer, by means of which the vegetables are to be cut into slices of a desired thickness, is mounted in the barrel and consists of a cylindrical body 6 which fits snugly in the barrel, as shown in Figure 2, and is open at its front end so that the slices may pass from it to the outlet at the front of the barrel. The cylindrical body of the barrel is formed in its walls with openings 7 each bordered by a diagonally extending cutting edge 8 which may be formed by sharpening an edge portion of the wall of the slicer body or may consist of a blade formed separate from the slicer body and permanently or detachably secured thereto so that it may be removed and sharpened when necessary.

Gauge plates 9 extend across the openings 7 and each is pivotally mounted at one end by a pin 10 mounted in a bearing 11 carried by the wall of the slicer body as shown in Figure 2 and an arm 12 extending from the plate at the opposite side thereof from the pin 10 and projecting longitudinally from the plate. This mounting arm is curved longitudinally, as shown in Figures 3 and 4 and terminates in a side extension or pin 13 loosely engaged through an opening formed in the head 14 of the slicer body. It will thus be seen that the gauge plates will be pivotally mounted and may be tilted to dispose them in desired spaced relation to the cutting edge 8 and cause slices of a desired thickness to be cut from vegetables placed in the hopper and resting upon the slicer body and the gauge plates as the slicer is rotated.

In order to rotate the slicer there has been provided a turning handle 15 having a hub extension 16 which projects through an opening formed in the head 2 of the barrel, as shown in Figure 5, and is secured to a disk or mounting member 17 by screws 18. This disk is disposed within the barrel and carries lugs 19 having reduced ends received in openings 19' formed in the head 14 of the slicer body and it will be readily understood that when the handle and mounting disk are turned the slicer body will be turned with them to successively bring the gauge plates and cutting edges into position to pass under the hopper and cut slices from the vegetables in the hopper.

The gauge plates must be adjusted and supported in an adjusted position and in order to do so there has been provided arms or rods 20 which project from the gauge plates and pass through slots 21 formed in the head 14 of the slicer. These rods are pivoted to links 22 which connect them to arms 23 projecting radially from a hollow shaft 24 which projects axially of the cutter from the head 14 and is journaled through the hub end of the handle 15. A collar 25 carried by the shaft and secured thereon by set screws 26 prevents the shaft and slicer from slipping forwardly and, therefore, the lugs 19 will be retained in the openings 19'. A bolt 27 carried by the head 14 projects through the shaft 24 with its threaded end projecting from the outer end thereof and to this threaded end is applied a nut 28 which, when tightened, binds the shaft to the slicer body and holds the shaft against rotation with the gauge plates in an adjusted position.

When this vegetable slicer is in use it is secured to a table, as shown in Figure 1, and a bowl or other receptacle placed upon the table under the spout 3. The vegetables are placed in the hopper and rest upon the cylindrical slicer body so that when this slicer body is rotated the gauge plates will move under the vegetables and the cutting edges cut their way through the vegetables. Rotation of the slicer is caused by turning the handle 15 which carries with it the disk 17 and as the prongs of the disk are engaged through the openings in the head of the slicer body, the slicer will rotate. In view of the fact that the nut 28 will be tightened, the hollow shaft will be frictionally held to the slicer head and turn with the handle. Therefore, the gauge plates will be held in a set position. If, however, it is found that the slices are too thick or too thin, it is merely necessary to loosen the nut 28 and the collar 25 can then be grasped and turned to rotate the shaft in a direction to extend or retrace the links 22. As the links are connected to the rods 20 projecting from the gauge plates these plates will be swung about their pivots to move the plates toward or away from the openings 9 and the cutting edges 8 and the thickness of slices cut from the vegetables in the hopper controlled. After the plates have been moved to the proper position the nut will be again tightened and the plates will be firmly held in the adjusted positions. When it is desired to take the device apart in order to thoroughly clean it, the nut will be removed, thus releasing the bolt 27 and permitting the cutter and the bolt to be withdrawn through the open discharge end of the barrel. The collar can also be removed after releasing the set screws and withdrawn from the hollow shaft, and the shaft, together with the disk or cross head, withdrawn from the barrel. A thorough cleaning can then be performed and the parts reassembled.

In Figure 6 there has been shown a slightly modified form of the invention. In this embodiment of the invention, the cylinder or slicer body, a fragment of which is shown and indicated by the numeral 29, will be formed with a desired number of openings each bordered by a cutting edge 30 corresponding to the cutting edges 8. Blades 31 are carried by the walls of the slicer body and project inwardly therefrom in spaced relation to each other longitudinally of the cutting edge 30 and are welded or otherwise firmly secured. The gauge plate 32 bears against the blades 31, as shown in this figure, and it will be readily seen that when the slicer is rotated, slices will be cut from potatoes placed in the hopper and the slices cut into strips for making French fried potatoes. It will be understood that cabbage may be cut for making slaw, or other vegetables cut into strips if so desired. The gauge plates 32 may be adjustably mounted, as previously set forth, in order that space between the blades 30 can be thoroughly cleaned, or they may be mounted in any other manner desired.

Having thus described the invention, what is claimed as new is:

1. In a vegetable slicer, a barrel having a head at one end and having its other end portion formed with an outlet, an inlet being formed between the outlet and the headed end of the barrel, a cylindrical slicer rotatably mounted in said barrel and having a head at one end and an open discharge end facing the outlet of the barrel, said slicer having its annular wall formed with an opening registering with the inlet as the slicer rotates and being sharpened along one side of the opening to form a cutting edge, a gauge plate in said slicer extending circumferentially thereof for the full length of the opening and pivoted at a longitudinal side edge of the opening and extending across the opening for regulating the thickness of slices cut, actuating means for rotating said slicer journaled through the head of said barrel and having clutch means at its inner end engaging the head of the slicer, a sleeve extending through the actuating means of the slicer, means carried by the head of the slicer for releasably holding the sleeve in a set position and releasably holding the slicer in engagement with the clutch means, and means for connecting said sleeve with the gauge plate and causing movement of the gauge plate to an adjusted position when the sleeve is turned about its axis.

2. In a vegetable slicer, a barrel having a head at one end and having its other end portion formed with an outlet, an inlet being formed between the outlet and the headed end of the barrel, a cylindrical slicer rotatably mounted in said barrel and having an open discharge end facing the outlet of the barrel, said slicer being formed with an opening registering with the inlet as the slicer rotates and being sharpened along one side of the opening to form a cutting edge, a gauge plate in said slicer pivoted at a side of the opening and extending across the same for regulating the thickness of slices cut, actuating means for rotating said slicer having a hub journaled through the head of the barrel and at its inner end provided with means adapted for engagement with the slicer, adjusting means for the gauge plate including a sleeve extending through the hub and rotatable therein for effecting adjustment of the gauge plate, and a fastener carried by the slicer and extending through the sleeve for binding the sleeve to the slicer when tightened and causing the sleeve to turn with the slicer and hub of the actuating means.

3. In a vegetable slicer, a barrel open at its front end and having an inlet between its ends, a cutter rotatably received in said barrel, a gauge adjustably carried by said cutter for regulating thickness of slices cut when the cutter is rotated, operating means for said cutter having a hub journaled through the rear end of the barrel, adjusting means for the gauge having an actuating element extending through the hub of the operating means of the cutter and rotatable therein to effect adjustment of the gauge, a stem carried by the cutter and extending axially through the actuating element, and a fastener threaded upon the outer end of the stem for engaging the outer end of the actuating element when tightened and binding the actuating element to the cutter to cause rotation thereof with the cutter and hub of the operating means with the gauge securely held in a set position.

4. In a vegetable slicer, a barrel having an inlet and having a head at one end and a discharge at its other end, a cylindrical slicer body in said barrel having an open end facing the discharge and a head at its inner end, a turning element having a hub extension rotatably engaged through the head of said barrel, a member carried by said hub within the barrel and provided with lugs engaged through openings formed in the head of the slicer body for imparting rotation to the slicer body, gauge plates pivoted in said slicer body for movement toward and away from openings formed in walls of the body, rods carried by said plates and projecting through slots formed in the head of the slicer body, a hollow shaft projecting from the head of the slicer body axially thereof and journaled through the hub of the turning element, a collar carried by said shaft and confining the hub between the collar and head of the barrel, a bolt extending from the head of the slicer body through the hollow shaft, a nut threaded upon said bolt for frictionally binding the shaft against the head of the slicer body and causing the shaft to turn with the slicer body, arms radiating from said shaft within the barrel, and links connecting said arms with the rods of said plates for shifting the plates about their pivots when the nut is loosened and the shaft turned.

HADEN R. IRICK.